US008991555B2

(12) United States Patent
Furseth et al.

(10) Patent No.: US 8,991,555 B2
(45) Date of Patent: Mar. 31, 2015

(54) TREE STAND

(75) Inventors: Michael R. Furseth, Cumberland, WI (US); Randy L. Schamberger, Cumberland, WI (US); Benjamin T. Nelson, Cameron, WI (US)

(73) Assignee: Ardisam, Inc., Cumberland, WI (US)

( * ) Notice: Subject to any disclaimer, the term of this patent is extended or adjusted under 35 U.S.C. 154(b) by 358 days.

(21) Appl. No.: 13/252,876

(22) Filed: Oct. 4, 2011

(65) Prior Publication Data

US 2012/0080267 A1 Apr. 5, 2012

Related U.S. Application Data

(60) Provisional application No. 61/389,539, filed on Oct. 4, 2010.

(51) Int. Cl.
*A01M 31/02* (2006.01)
*E06C 1/10* (2006.01)
*E06C 7/16* (2006.01)
*E06C 7/48* (2006.01)

(52) U.S. Cl.
CPC .................. *A01M 31/02* (2013.01); *E06C 1/10* (2013.01); *E06C 7/16* (2013.01); *E06C 7/48* (2013.01)
USPC ............ 182/187; 182/116; 182/222; 108/135

(58) Field of Classification Search
USPC ......... 182/187, 188, 135, 136, 222, 116, 115, 182/123, 124, 125, 126; 108/134, 135
See application file for complete search history.

(56) References Cited

U.S. PATENT DOCUMENTS

| | | | |
|---|---|---|---|
| 3,220,766 A | 11/1965 | Kates | |
| 3,358,789 A | 12/1967 | Laun | |
| 3,419,108 A | 12/1968 | Mobbs | |
| 3,655,478 A * | 4/1972 | Geschwender | ............... 156/202 |
| 4,022,292 A | 5/1977 | Van Gompel | |
| 4,078,351 A * | 3/1978 | Simpson | .......................... 52/536 |
| 4,129,198 A * | 12/1978 | Hunter | .......................... 182/187 |
| 4,134,474 A | 1/1979 | Stavenau et al. | |
| 4,257,490 A | 3/1981 | Bandy | |
| 4,539,455 A * | 9/1985 | Colato et al. | .................. 219/732 |
| 4,549,635 A | 10/1985 | Early | |
| 4,552,247 A | 11/1985 | Purdy | |

(Continued)

OTHER PUBLICATIONS

Big Game Treestands; Brochure "Live the Legacy"; Windom, Minnesota, United States; 2007 (46 pgs.).

(Continued)

*Primary Examiner* — Daniel Cahn
(74) *Attorney, Agent, or Firm* — Stoel Rives LLP

(57) ABSTRACT

Tree stands are disclosed for providing an elevated standing location. The tree stand can include a support post, a seat rotatably coupled to the first end of the support post, and a platform rotatably coupled to the second end of the support post. The platform can rotate from a transport configuration to an operable configuration. The platform in the operable configuration is approximately perpendicular to the support post. The platform has a tree contact point positioned above a plane of the platform when the platform is in the horizontal position. The platform can comprise a plurality of hexagons with groups of three hexagons intersecting at a point and forming a honeycomb pattern defining a top standing surface on which a hunter can stand. The contact point is configured to create an over-center locking action. The tree stand can also include a stackable ladder coupled to the platform.

18 Claims, 7 Drawing Sheets

(56) References Cited

U.S. PATENT DOCUMENTS

| | | | | |
|---|---|---|---|---|
| 4,579,198 A * | 4/1986 | Lee | | 182/115 |
| 4,603,757 A * | 8/1986 | Hollinger | | 182/187 |
| 4,708,221 A * | 11/1987 | Kubiak | | 182/187 |
| 4,742,888 A * | 5/1988 | Amacker | | 182/116 |
| 4,782,918 A * | 11/1988 | Brunner et al. | | 182/187 |
| 4,784,239 A | 11/1988 | Kirkman | | |
| 4,905,792 A | 3/1990 | Wilson | | |
| 4,951,696 A * | 8/1990 | Jones, Sr. | | 135/90 |
| 4,997,063 A * | 3/1991 | Bradley | | 182/187 |
| 5,009,283 A | 4/1991 | Prejean | | |
| 5,060,756 A * | 10/1991 | D'Acquisto | | 182/187 |
| 5,064,020 A | 11/1991 | Eagleson | | |
| 5,105,908 A | 4/1992 | Freund | | |
| 5,117,942 A | 6/1992 | Tzavaras | | |
| D329,501 S | 9/1992 | Friesenhahn | | |
| 5,199,527 A * | 4/1993 | Jennings | | 182/187 |
| 5,253,732 A * | 10/1993 | Daniels | | 182/116 |
| 5,275,257 A | 1/1994 | Robertson | | |
| 5,297,656 A * | 3/1994 | Amacker | | 182/187 |
| 5,363,941 A * | 11/1994 | Richard | | 182/187 |
| 5,564,524 A | 10/1996 | Thaggard et al. | | |
| 5,641,036 A * | 6/1997 | Maxwell | | 182/135 |
| 5,791,436 A * | 8/1998 | Talley, Sr. | | 182/116 |
| 5,842,540 A | 12/1998 | Mancini, Jr. | | |
| 5,881,839 A | 3/1999 | Stanley | | |
| 5,927,435 A | 7/1999 | Benton | | |
| 5,927,437 A | 7/1999 | Fast | | |
| 5,992,112 A * | 11/1999 | Josey | | 52/309.8 |
| 5,996,738 A | 12/1999 | Nelsen | | |
| 6,145,619 A | 11/2000 | Risser | | |
| 6,199,660 B1 | 3/2001 | Meeks | | |
| D445,201 S * | 7/2001 | D'Acquisto | | D25/62 |
| D452,331 S | 12/2001 | Bohlman | | |
| 6,336,520 B1 * | 1/2002 | Amacker | | 182/187 |
| 6,386,321 B1 * | 5/2002 | Muhich | | 182/187 |
| 6,505,707 B1 * | 1/2003 | Berry | | 182/20 |
| 6,516,919 B1 * | 2/2003 | Sempel | | 182/20 |
| 6,520,291 B2 | 2/2003 | Andrey | | |
| 6,568,505 B1 * | 5/2003 | D'Acquisto | | 182/187 |
| 6,622,823 B2 | 9/2003 | Engstrom | | |
| 6,722,472 B2 * | 4/2004 | Berkbuegler | | 182/187 |
| 6,725,972 B1 | 4/2004 | Krier et al. | | |
| 6,824,115 B1 * | 11/2004 | Batson | | 248/238 |
| 6,866,120 B1 * | 3/2005 | Butterworth | | 182/187 |
| 6,883,644 B1 | 4/2005 | Braun et al. | | |
| 6,942,065 B1 | 9/2005 | Price | | |
| 6,948,587 B2 | 9/2005 | Griffiths | | |
| 7,021,423 B1 | 4/2006 | Pestrue et al. | | |
| 7,174,995 B1 * | 2/2007 | Alexander | | 182/187 |
| RE39,725 E * | 7/2007 | Muhich | | 182/187 |
| 7,246,683 B2 * | 7/2007 | Pringnitz | | 182/187 |
| 7,328,663 B2 * | 2/2008 | Leng | | 108/157.14 |
| 7,377,361 B1 * | 5/2008 | Tschida | | 182/188 |
| 7,434,662 B2 * | 10/2008 | McFall et al. | | 182/187 |
| 7,931,237 B2 * | 4/2011 | Penzo | | 244/173.1 |
| 8,177,177 B2 * | 5/2012 | Ehrig et al. | | 248/218.4 |
| 8,424,645 B2 * | 4/2013 | Schlipf | | 182/230 |
| 2002/0112919 A1 | 8/2002 | Graham, Jr. | | |
| 2003/0000430 A1 * | 1/2003 | Sepe et al. | | 108/44 |
| 2003/0019176 A1 * | 1/2003 | Anderson | | 52/309.9 |
| 2003/0192741 A1 * | 10/2003 | Berkbuegler | | 182/187 |
| 2004/0084248 A1 | 5/2004 | Burgeson | | |
| 2004/0216953 A1 | 11/2004 | Cheeks | | |
| 2005/0167200 A1 * | 8/2005 | McFall et al. | | 182/187 |
| 2006/0054397 A1 * | 3/2006 | Pringnitz | | 182/187 |
| 2007/0000726 A1 * | 1/2007 | Berkbuegler | | 182/187 |
| 2007/0039779 A1 | 2/2007 | Ellingson | | |
| 2007/0114096 A1 * | 5/2007 | Skipper | | 182/116 |
| 2007/0181365 A1 * | 8/2007 | Braud | | 182/115 |
| 2007/0256897 A1 * | 11/2007 | Feltner | | 182/187 |
| 2007/0261919 A1 * | 11/2007 | Roe | | 182/187 |
| 2008/0128204 A1 | 6/2008 | Engstrom | | |
| 2008/0149422 A1 | 6/2008 | Lott | | |
| 2009/0229916 A1 | 9/2009 | Berkbuegler | | |
| 2009/0321186 A1 * | 12/2009 | Louchart | | 182/188 |
| 2010/0065371 A1 * | 3/2010 | Glenn | | 182/187 |
| 2010/0300808 A1 * | 12/2010 | Hale | | 182/187 |
| 2011/0070458 A1 * | 3/2011 | Quan et al. | | 428/593 |
| 2011/0132686 A1 * | 6/2011 | Priest | | 182/187 |
| 2012/0080269 A1 | 4/2012 | Furseth et al. | | |
| 2012/0111666 A1 | 5/2012 | Furseth et al. | | |
| 2012/0168249 A1 | 7/2012 | Furseth et al. | | |

OTHER PUBLICATIONS

Cabela's; Catalog "Archery"; Sidney, Nebraska, United States; 2006 (8 pgs.).

Office Action mailed Jan. 19, 2010 in U.S. Appl. No. 11/627,772, filed Jan. 26, 2007.

Office Action mailed Aug. 19, 2010 in U.S. Appl. No. 11/627,772, filed Jan. 26, 2007.

Office Action mailed Mar. 29, 2011 in U.S. Appl. No. 11/627,772, filed Jan. 26, 2007.

* cited by examiner

TREE STAND

RELATED APPLICATIONS

This application claims the benefit under 35 U.S.C. §119(e) of U.S. Provisional Patent Application No. 61/389,539, filed Oct. 4, 2010, and entitled HUNTING LADDER STAND HAVING HEXAGONAL PLATFORM, which is hereby incorporated by reference herein in its entirety.

TECHNICAL FIELD

The present disclosure relates to tree stands.

BACKGROUND

Hunting wild game from a position elevated above the ground provides several benefits over hunting from ground level. A hunter that is perched above the ground can be positioned above an animal's normal field of view, reducing the likelihood that the animal will spot the hunter first. The scent of the hunter is also above the prey's nose, minimizing the chance that the animal will smell the hunter before the hunter can spot the animal. Also, the hunter's range of vision may be increased and allow shots over otherwise obstructing limbs and brush.

A variety of tree stands have been developed that can elevate hunters above the ground and allow the aforementioned benefits. These tree stands may be adapted to be readily attached to a tree, post, or other vertical support member to provide a platform, seat, or combination of both at any desired level above the ground. Presently available tree stands adapted to be attached to a tree, post, or other vertical support member can be unstable and may tend to bounce, both of which can cause a user (such as a hunter) to fall from the tree stand.

SUMMARY

The present disclosure provides embodiments of tree stands for providing, for example, an elevated standing and/or sitting position. The tree stands may be configured to be secured to a tree. The tree stands may enable a user to climb a tree and/or may be accessible via a collapsible and/or stackable ladder.

Additional aspects and advantages will be apparent from the following detailed description of preferred embodiments, which proceeds with reference to the accompanying drawings.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION OF PREFERRED EMBODIMENTS

The present disclosure provides embodiments of tree stands that are adapted to providing an elevated standing and/or sitting position. The tree stands may be configured to be secured to a tree or other upright support structure. The tree stands may enable a user to climb the tree or the other upright support structure and/or may be accessible via a collapsible and/or stackable ladder. A user may desire an elevated position for a variety of reasons. For example, a user, such as a hunter, may use the stand to obtain an elevated position from which to hunt. As another example, the tree stand may also be used for maintenance of equipment in an elevated position and/or supported by an upright and/or generally vertical support structure, such as power lines.

The tree stands of the present disclosure may also be easily portable, transitioning from an operable configuration to a transport configuration that may be more compact and easily transported. The stackable ladder of the tree stand can also be transitioned between an extended operable (extended) configuration to a transport (stacked) configuration that may be more easily transported.

The embodiments disclosed herein are described in terms of their use for hunting. As can be appreciated, the scope of the disclosure is not so limited and the embodiments described herein can be adapted for a variety of purposes and for use with a variety of upright and/or generally vertical support structures.

Figure 1:
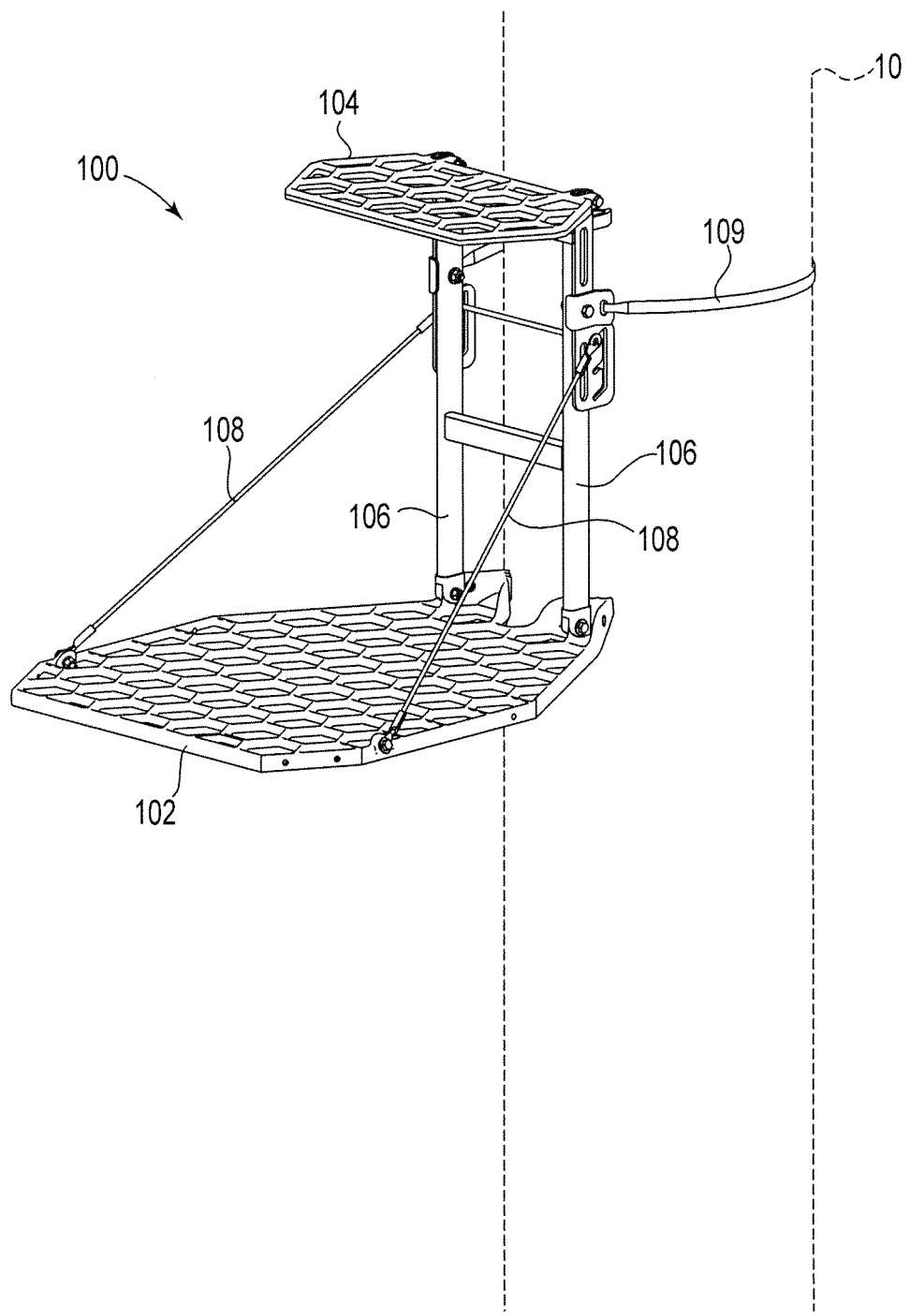
FIG. 1 illustrates a perspective view of a tree stand, according to one embodiment of the present disclosure.

FIG. 1 illustrates a perspective view of a tree stand 100, according to one embodiment of the present disclosure. The tree stand 100 may be a hang-on tree stand. The tree stand 100 may include a platform 102, a seat 104, one or more support posts 106, and one or more support cables 108. The tree stand 100 may be configured to engage a tree 10, or other generally vertical upright, substantially cylindrical structure, to provide an elevated perch from which, for example, a hunter can hunt. The platform 102 may be configured such that a hunter can stand on the platform 102. The seat 104 may be configured to be positioned above the platform 102 and may provide a place for the hunter to sit. The platform 102 and seat 104 may be coupled together by the support post(s) 106.

The platform 102 may be rotatably coupled to a first end (e.g. a bottom end) of the support post(s) 106 in such a manner that it can be rotated from a vertical position, for example, approximately 0 degrees from, or substantially parallel to, the support post(s) 106, to a horizontal position, for example, approximately 90 degrees from, or substantially perpendicular to, the support post(s) 106 and/or parallel to the ground.

Similarly, the seat 104 may be rotatably coupled to a second end (e.g. a top end) of the support post(s) 106 in such a manner that it can be rotated from a vertical position, for example, approximately 0 degrees from, or substantially parallel to or inline with, the support post(s) 106, to a horizontal position, for example, approximately 90 degrees from, or substantially perpendicular to, the support post(s) 106.

Rotation of the platform 102 and the seat 104 enables the tree stand 100 to transition between a transport configuration (with the platform 102 and seat 104 in the vertical position) and an operable configuration (with the platform 102 and seat 104 in the horizontal position). FIG. 1 depicts the tree stand 100 in the operable configuration.

The support cables 108 may extend from the support post(s) 106 at an angle and couple to the platform 102 at a point a distance outward from the support post(s) 106. The support cables 108 may provide additional support to the platform 102 and may be configured to restrict rotation of the platform 102 relative to the support post(s) 106 beyond the horizontal position (e.g., past 90 degrees from the support post(s) 106 and/or past an orientation generally parallel to the ground). The support cables 108 may be adjustable to vary the angle between the platform and the support post(s) to achieve a desired horizontal position. For example, in the illustrated embodiment, the position of the support cables 108 relative to the support post(s) 106 may be adjustable. As another example, the length of the support cables 108 may be adjustable. Thus, the support cables 108 may support the platform 102 in a generally horizontal position, parallel to the ground, when the tree stand is attached to the tree 10 or other elongate vertical support structure.

The tree stand 100 may further comprise one or more securement straps 109 to secure the tree stand 100, for example, to a tree 10 or other elongate generally vertical support structure. The one or more securement straps 109 may be secured to the support post(s) 106 and may be configured to wrap around a tree trunk or other vertical structure. The platform 102 may include a "V-shaped" tree contact point. As described in greater detail below, the platform 102 may be configured such that downward rotation of the platform 102 from the vertical position toward the horizontal position causes the support post(s) 106 to move outwardly from the tree trunk, thereby putting tension on and/or tightening the one or more securement straps 109. Tension on the one or more securement straps 109 secures the tree stand 100 against vertical movement of the tree stand 100 up or down the tree trunk. The seat 104 may also include a "V-shaped" tree contact point. The tree contact point of the seat 104 may be a notch and may include tree engaging teeth. The seat 106 may be configured such that downward rotation of the seat 104 from the vertical position toward the horizontal position causes the tree contact point of the seat 104 to engage the tree and, in turn, drive the support post(s) 106 to move outwardly from the tree trunk, thereby putting tension on and/or tightening the one or more securement straps 109.

Figure 2A:
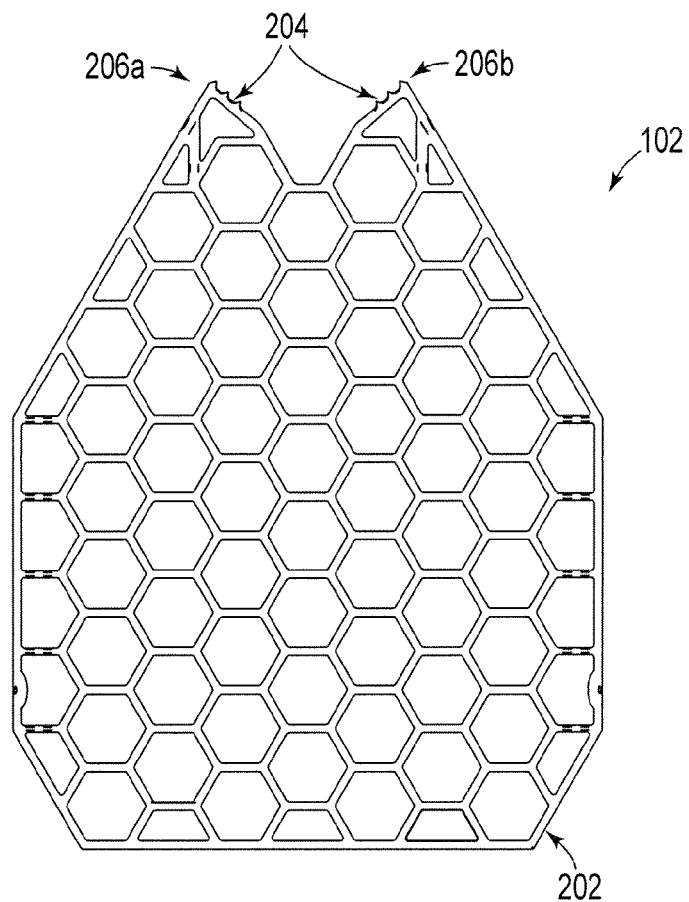
FIGS. 2A-2E illustrate various views of a platform of the tree stand shown in FIG. 1.
Figure 2B:
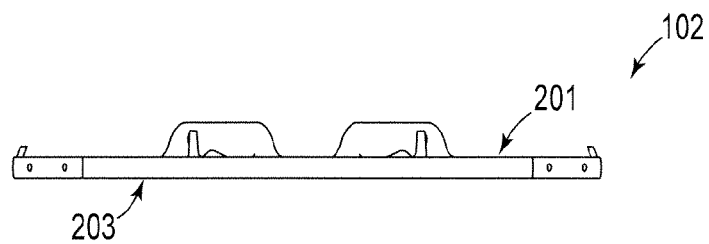
Figure 2C:
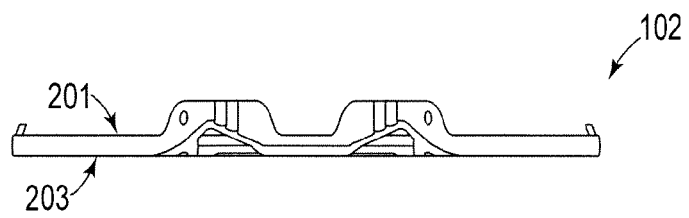
Figure 2D:
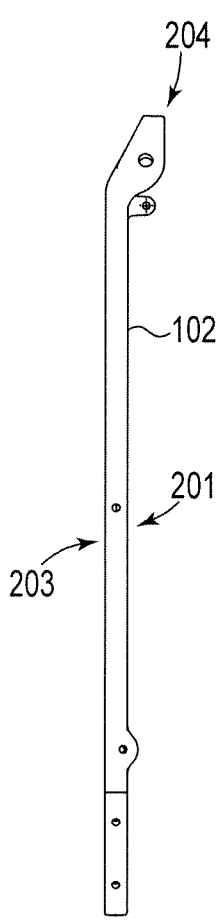
Figure 2E:
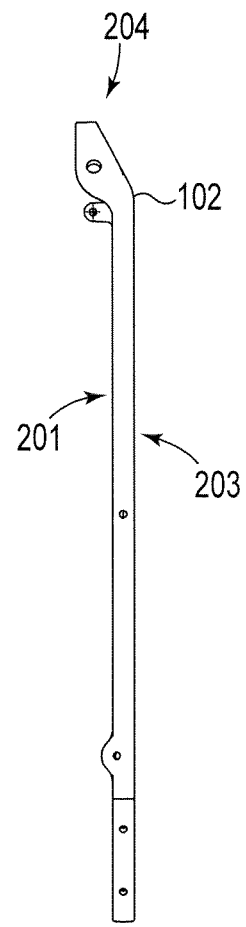

FIGS. 2A-2E illustrate various views of the platform 102 of the tree stand 100 shown in FIG. 1. FIG. 2A is a top view of the platform 102. FIG. 2B is a front end view of the platform 102. FIG. 2C is a back end view of the platform 102. FIGS. 2D and 2E are lateral side views of the platform 102. The platform 102 may be cast to form a lightweight, durable support structure that provides a standing surface 201. For example, the platform 102 may include a plurality of hexagons 202, with three hexagons intersecting at a point, thereby making a "honeycomb" pattern having a top standing surface 201 and a bottom surface 203. The platform 102 may be cast of a lightweight rigid material such as a rigid plastic or a metal, such as for example aluminum. In other embodiments, the platform may be formed of any of a variety of rigid, lightweight materials, including but not limited to a composite material (e.g., carbon fiber), fiberglass, a natural material (e.g., wood).

The platform 102 may include a tree contact point 204 that is located above a plane of the platform 102. The tree contact point 204 may comprise a pair of protrusions 206a, 206b to engage the tree 10 (FIG. 1). The protrusions 206a, 206b may be positioned in a plane above a plane of a standing surface 201 of the platform 102. In other words, the tree contact point 204 may be positioned higher (more vertical) than the standing surface 201 of the platform 102 when the platform 102 is in the horizontal position in the operable configuration. The protrusions 206a, 206b may form a "V-shape" or notch to receive the surface of the tree 10. The tree contact point 204 may further include tree engaging teeth configured to engage the tree and increase frictional forces between the platform 102 and the tree 10.

The tree contact point 204 may be positioned above the standing surface 201, thereby forming an "L" shape. The "L" shape of the platform 102 may provide for greater locking force than a platform having a tree contact point essentially in the same plane as the plane of the platform. In particular, as the platform 102 is folded downward from the vertical position to the horizontal position, the point of greatest resistance to rotation, as the two protrusions 206a, 206b engage the tree 10, may generally be between about 70 degrees to about 85 degrees. Resistance to rotation may then decrease during rotation from 85 degrees to 90 degrees, which allows the platform to lock into place. The drop-off of resistance to rotation may, in effect, create an over-center locking action or mechanism that may make the platform 102 more stable and secure when in the horizontal position. Moreover, the over-center locking may stabilize the platform 102 and limit bouncing of the platform 102 as a user stands on and/or walks on the standing surface 201.

As can be appreciated the point of greatest resistance to rotation may be within another range of the rotation. For example, in another embodiment, the range within which there is the greatest resistance to rotation may be between 75 degrees and 85 degrees. In another embodiment, the range within which there is the greatest resistance to rotation may be between 65 degrees and 85 degrees. In another embodiment, the range within which there is the greatest resistance to rotation may be between 60 degrees and 85 degrees. In another embodiment, the range within which there is the greatest resistance to rotation may be between 55 degrees and 85 degrees. In another embodiment, the range within which there is the greatest resistance to rotation may be between 50 degrees and 85 degrees. In another embodiment, the range within which there is the greatest resistance to rotation may be between 50 degrees and 80 degrees. In another embodiment, the range within which there is the greatest resistance to rotation may be between 50 degrees and 75 degrees. In another embodiment, the range within which there is the greatest resistance to rotation may be between 50 degrees and 70 degrees. In another embodiment, the range within which there is the greatest resistance to rotation may be between 50 degrees and 65 degrees. In another embodiment, the range within which there is the greatest resistance to rotation may be between 50 degrees and 60 degrees. In another embodiment, any suitable point of rotation may be configured as a point of greatest resistance to rotation to create an over-center action.

Figures 3A, 3B:
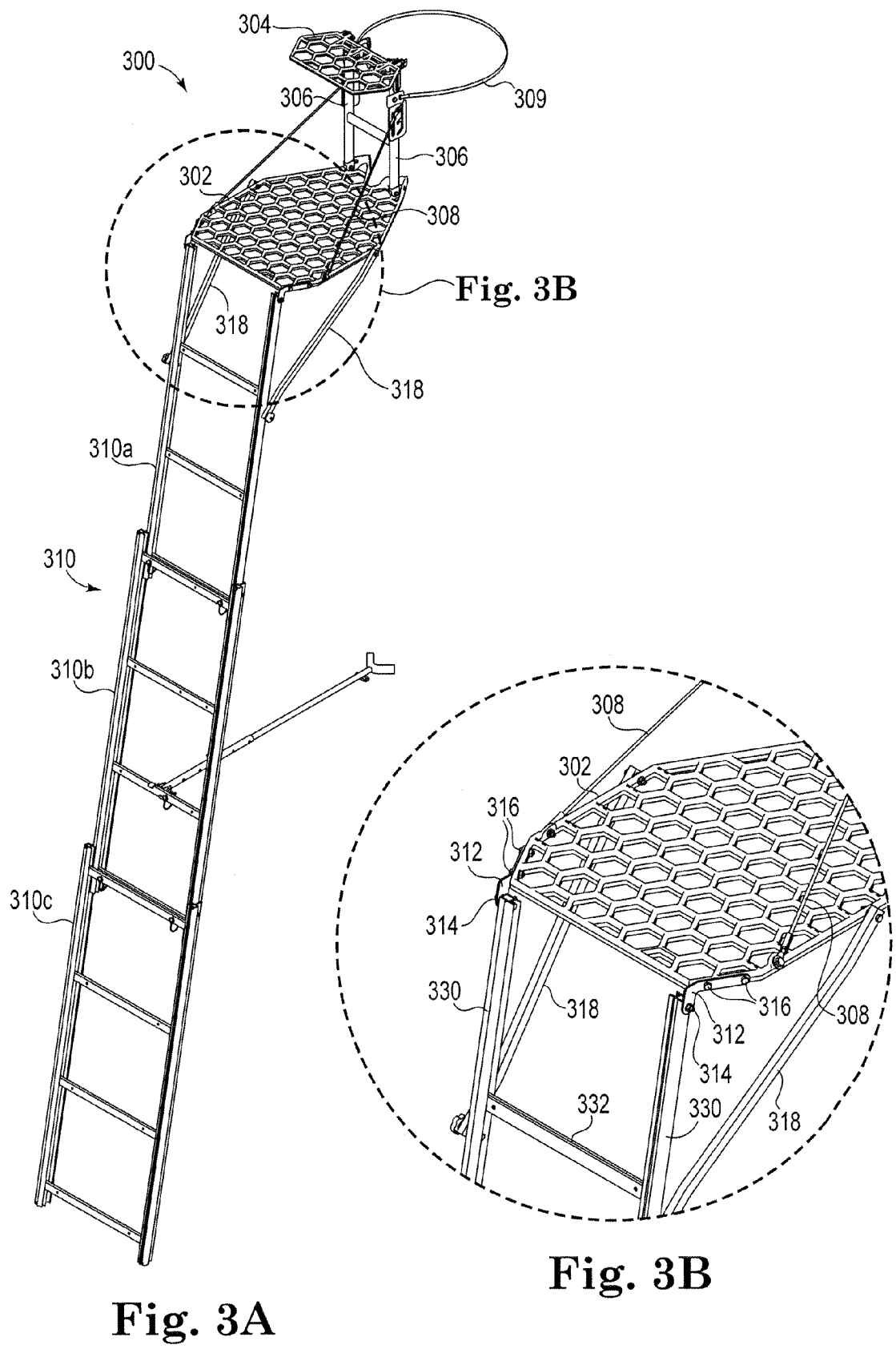
FIGS. 3A and 3B illustrate a perspective view and a detailed perspective view, respectively, of another embodiment of a tree stand, according to the present disclosure.

FIGS. 3A and 3B illustrate a perspective view and detailed perspective view, respectively, of a tree stand 300, according to another embodiment of the present disclosure. The tree stand 300 may include a platform 302, a seat 304, support posts 306, and an optional sliding stackable ladder 310. Thus, the tree stand 300 may be a ladder tree stand. The ladder 310 may be releasably attached to the platform 302, for example with "L" brackets 312 and fasteners 314. The platform 302 may also have holes for accepting fasteners 316 to secure the "L" brackets 312 to the platform 302. The ladder 310 may also be attached to the platform 302 by ladder support arms 318. The platform 318 may include holes for attaching the ladder support arms 318. The ladder 310 may include a plurality of ladder segments 310a, 310b, 310c. Each of the ladder segments 310a, 310b, 310c may include a pair of rails 330a, 330b, 330c (collectively 330) connected by a plurality of rungs 332.

Figure 4B:
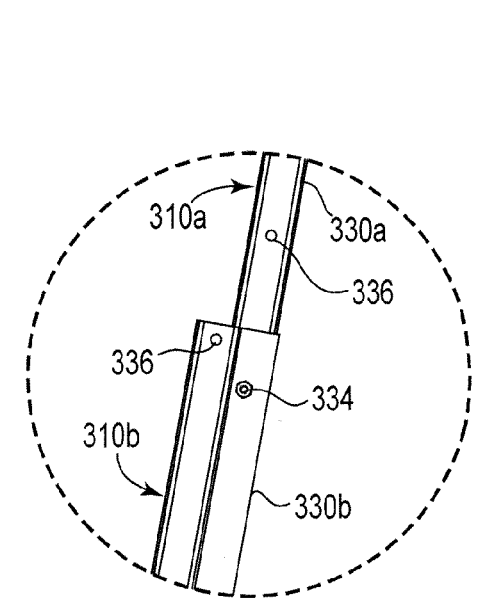
FIGS. 4A, 4B, and 4C illustrate a side view and detailed side views, respectively, of the tree stand shown in FIG. 3.
Figure 4C:
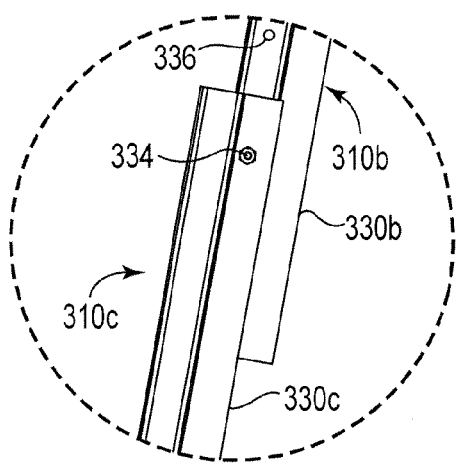
Figure 4A:
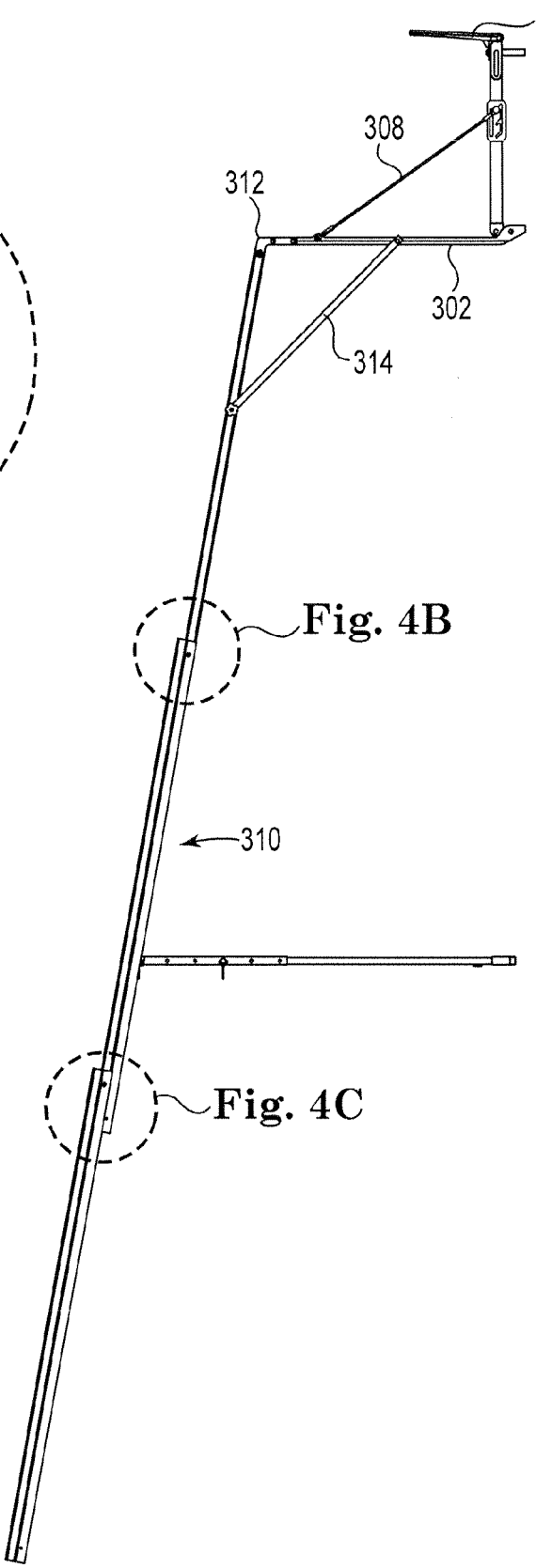

FIGS. 4A, 4B, and 4C illustrate a side view and detailed side views, respectively, of the tree stand 300 shown in FIG. 3A. The ladder segments 310a, 310b, 310c of the sliding stackable ladder 310 may be locked into place relative to each other using spring pins 334 and holes 336 in the ladder rails 330. Multiple holes 336 or stops may be provided so that a height/length of the ladder 310 (and a height of the tree stand 300) can be adjusted. The rails 330b of the second ladder segment 310b may be configured to receive the rails 330a of the first ladder segment 310a. In other words, the rails 330a of the first ladder segment 310a slide into the rails 330b of the second ladder segment 310b (or otherwise transition to a stacked configuration with respect to the second ladder segment 310b). Similarly, the rails 330c of the third ladder segment 310c are configured to receive at least a portion of the rails 330b of the second ladder segment 310b. In other words, a portion of the rails 330b of the second ladder segment 310b may slide into the rails 330c of the third ladder segment 310c (or otherwise transition to a stacked configuration with respect to the third ladder segment 310b). Accordingly, the height (or length) of the ladder 310 can be adjusted and/or transitioned from an extended (operable) configuration (as shown in FIGS. 3 and 4) to a stacked (transport) configuration. In the illustrated embodiment, the ladder 310 may be uncoupled from the platform 302 during transport.

Figure 5A:
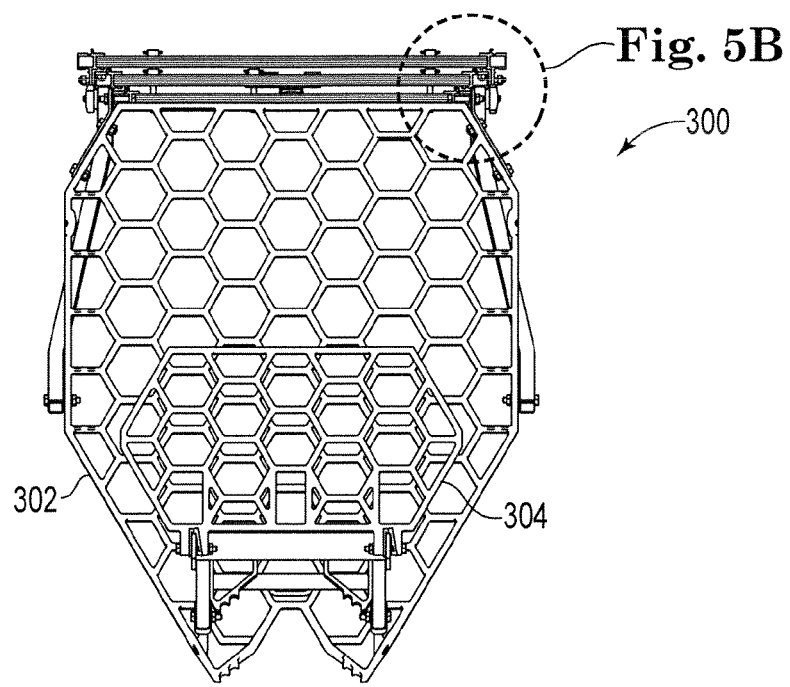
FIGS. 5A and 5B illustrate a top view and a detailed top view, respectively, of the tree stand of FIG. 3.
Figure 5B:
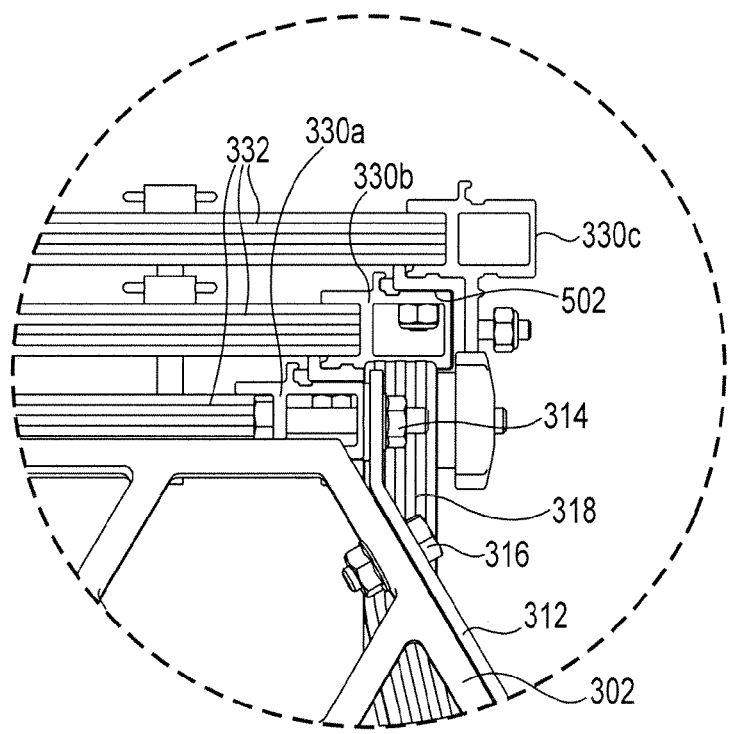

FIGS. 5A and 5B illustrate a top view and detailed top view, respectively, of the tree stand shown in FIG. 3A in the operable configuration. The illustrated view is looking down the stackable ladder 310 rather than directly perpendicular to the generally horizontal seat 304 and platform 302, The seat 304 is positioned over and a distance above the platform 302. The ladder rails 330 of, for example, the second ladder segment 310b and the third ladder segment 310c may include channels 502 to receive at least a portion of the rails of the first ladder segment 310a or second ladder segment 310b, respectively, to transition to the "stacked" or transport configuration, on top of one another and/or within one another, thereby decreasing the length of the ladder 310. A protruding portion of ladder rails 310a and 310b may be configured to fit into the channels 502. This nested or telescoping feature may also allow the ladder segments 310a, 310b, 310c to be progressively narrower. The ladder channels 502 can be separated by spacers, preferably made of plastic. The plastic spacers also may reduce the noise of the tree stand 300, may make sliding the ladder segments 310a, 310b, 310c easier, and may increase stability of the ladder 310 when it is the extended operable configuration.

Figure 6:
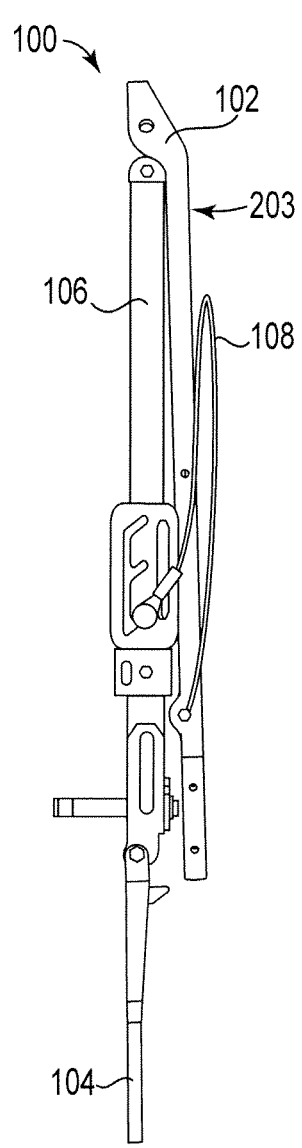
FIG. 6 illustrates a tree stand in a transport configuration, according to one embodiment of the present disclosure.

FIG. 6 illustrates the tree stand 100 of FIG. 1 in the transport configuration, according to one embodiment of the present disclosure. As illustrated, in the transport configuration, the platform 102 is rotated to a substantially vertical position, approximately 0 degrees relative to the support post(s) 106. In another embodiment, the an angle between the support post(s) 106 and the platform 102 is less than approximately 15 degrees. Similarly, the seat 104 is rotated to a substantially vertical position, approximately 0 degrees relative to, or in line with, the support posts 106. In another embodiment, the an angle between the support post(s) 106 and the seat 104 is less than approximately 15 degrees. With the tree stand 100 in the transport configuration, a hunter can attach carry straps (not shown) to the bottom surface 203 of the platform 102 for carrying the tree stand 100 similar to a backpack.

Figure 7:
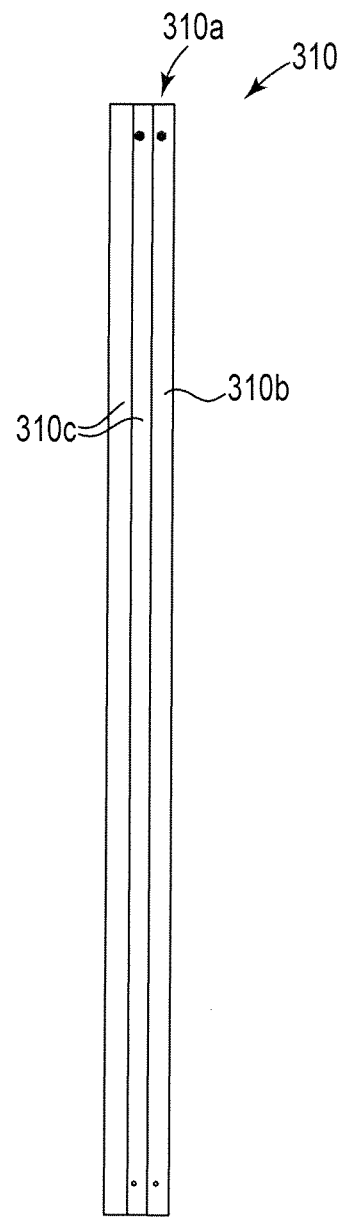
FIG. 7 illustrates a stackable ladder in a stacked configuration, according to one embodiment of the present disclosure.

FIG. 7 illustrates the ladder 310 of FIG. 3 in the stacked configuration, according to one embodiment of the present disclosure. As shown, the ladder segments 310a, 310b, 310c are stacked and/or received into one another, thereby reducing the length of the ladder 310.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges, which may independently be included in the smaller ranges, is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belong. Although any methods and materials similar or equivalent to those described herein can also be used in the practice or testing of the disclosure, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure are not entitled to antedate such publication by virtue of prior invention. Further, the dates of publication provided may be different from the actual publication dates which may need to be independently confirmed.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

As can be appreciated, the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

The invention claimed is:

1. A tree stand configured to attach to a tree or other elongated vertical structure to provide an elevated standing position above ground, the tree stand comprising:
   a support post configured to be positioned proximate the tree or other elongated vertical structure;
   a securement strap to secure the tree stand to the tree or other elongated vertical structure, the securement strap configured to couple at a first end to the tree stand, form a loop that wraps around the tree or other elongated vertical structure, and couple at a second end to the tree stand;
   a platform rotatably coupled to the support post, the platform configured to rotate from a transport configuration to an operable configuration, wherein the platform in the operable configuration is arranged in a horizontal position approximately parallel to the ground, the platform having a tree contact point positioned above a plane defined by a top surface of the platform when the platform is in the horizontal position of the operable configuration, the tree contact point configured to engage the tree or other elongated vertical structure, wherein when the tree stand is attached to a tree or other elongated vertical structure, rotation of the platform from the transport configuration to the operable configuration causes the tree contact point to engage the tree or other elongated vertical structure and increase tension on the securement strap to secure the tree stand to the tree or other elongated vertical structure, wherein the platform comprises a plurality of hexagons with groups of three hexagons intersecting at a point and forming a honeycomb pattern defining the top surface on which a user can directly stand; and
   a ladder releasably coupled to the platform, the ladder comprising a plurality of ladder segments each comprising a pair of rails coupled together by a plurality of rungs extending between the rails, the rails comprise channels that permit adjacent ladder segments to slide parallel to each other between an extended operable configuration to a substantially overlapping stacked transport configuration.

2. The tree stand of claim 1, wherein the tree contact point of the platform comprises a pair of protrusions extending from the platform toward the tree and positioned in a plane above the plane of the platform with the platform in the horizontal position, the protrusions forming a V-shape configured to receive a surface of the tree or elongated vertical structure.

3. The tree stand of claim 1, wherein the platform in the transport configuration extends from a second end of the support post in a direction generally along a longitudinal axis of the support post and toward a first end of the support post.

4. The tree stand of claim 1, further comprising a seat rotatably coupled to a first end of the support post.

5. The tree stand of claim 1, wherein the tree contact point of the platform engaging the tree or elongated vertical structure during rotation from the transport configuration to the operable configuration creates resistance to the rotation of the platform, and wherein a point of greatest resistance to rotation is between approximately 60 degrees and approximately 85 degrees relative to the support post and resistance to rotation is reduced at a point in rotation past the point of greatest resistance.

6. The tree stand of claim 1, further comprising a support cable configured to restrict rotation of the platform relative to the support post beyond the horizontal position.

7. The tree stand of claim 6, wherein the support cable extends between a position on the support post toward a first end of the support post and a position on the platform a distance outward from the support post.

8. The tree stand of claim 6, wherein the support cable is adjustable such that an angle between the platform in the horizontal position and the support post is adjustable.

9. The tree stand of claim 1, wherein the ladder can be adjusted to a plurality of different lengths.

10. A tree stand configured to attach to a tree or other elongated vertical structure to provide an elevated standing and sitting position above ground, the tree stand comprising:
   a support post having a first end and a second end and configured to extend in a direction generally parallel to a longitudinal axis of the tree or other elongated vertical structure;
   a securement strap to secure the tree stand to the tree or other elongated vertical structure, the securement strap configured to couple at a first end to the tree stand, form a loop that wraps around the tree or other elongated vertical structure, and couple at a second end to the tree stand;
   a seat rotatably coupled to the first end of the support post;
   a platform rotatably coupled to the second end of the support post, the platform configured to rotate from a transport configuration to an operable configuration, wherein the platform in the operable configuration is arranged in a horizontal position, transverse to the support post, approximately parallel to the ground, the platform having a tree contact point positioned above a plane defined by a top surface of the platform when the platform is in the horizontal position of the operable configuration, the tree contact point configured to engage the tree or other elongated vertical structure, wherein when the tree stand is attached to the tree or other elongated vertical structure, rotation of the platform from the transport configuration to the operable configuration causes the tree contact point to engage the tree or other elongated vertical structure and increase tension on the securement strap to secure the tree stand to the tree or other elongated vertical structure, wherein the platform comprises a plurality of hexagons with groups of three hexagons intersecting at a point and forming a honeycomb pattern defining the top surface on which a user can directly stand; and
   a ladder releasably coupled to the platform, the ladder comprising a plurality of ladder segments each comprising a pair of rails coupled together by a plurality of rungs extending between the rails, the rails comprise channels that permit adjacent ladder segments to slide parallel to each other between an extended operable configuration to a substantially overlapping stacked transport configuration.

11. The tree stand of claim 10, wherein the tree contact point of the platform comprises a pair of protrusions extending from the platform toward the tree and positioned in a plane above the plane of the platform with the platform in the horizontal position, the protrusions forming a V-shape configured to receive a surface of the tree or elongated vertical structure by which the tree stand is to be secured.

12. The tree stand of claim 10, wherein the platform in the transport configuration extends from the second end of the support post in a direction generally along a longitudinal axis of the support post and toward the first end of the support post and the seat, and wherein the seat in the transport configuration extends from the first end of the support post in line with and in a direction generally the same as the platform in the transport configuration.

13. The tree stand of claim 10, wherein the seat in the operable configuration is positioned in a plane generally parallel to the plane of the platform in the operable configuration and above the platform a suitable distance to allow a user to sit on the seat and position his feet on the platform.

14. The tree stand of claim 10, wherein the tree contact point of the platform engaging the tree or elongated vertical structure during rotation from the transport configuration to the operable configuration creates resistance to the rotation of the platform, and wherein a point of greatest resistance to rotation is between approximately 60 degrees and approximately 85 degrees relative to the support post, and resistance to rotation is reduced at a point in rotation past the point of greatest resistance.

15. The tree stand of claim 10, further comprising a support cable extending between a position on the support post toward the first end of the support post and a position on the platform a distance outward from the support post, wherein the support cable is configured to restrict rotation of the platform relative to the support post beyond the horizontal position.

16. The tree stand of claim 10, wherein the ladder can be adjusted to a plurality of different lengths.

17. The tree stand of claim 10, wherein first and second ends of the securement strap couple to the support post of the tree stand.

18. The tree stand of claim 10 wherein the support post comprises a pair of support posts.

* * * * *